No. 821,406. PATENTED MAY 22, 1906.
J. H. ERNST.
ALCOHOL BURNER.
APPLICATION FILED JULY 15, 1905.

Witnesses:

Inventor:
John H. Ernst
by his attorney

UNITED STATES PATENT OFFICE.

JOHN H. ERNST, OF NEW YORK, N. Y., ASSIGNOR TO SILVER & COMPANY, OF BROOKLYN, N. Y., A CORPORATION OF NEW YORK.

ALCOHOL-BURNER.

No. 821,406.   Specification of Letters Patent.   Patented May 22, 1906.

Application filed July 15, 1905. Serial No. 269,815.

*To all whom it may concern:*

Be it known that I, JOHN H. ERNST, a citizen of the United States of America, and a resident of the borough of Brooklyn, New York city, in the State of New York, have invented a new and useful Improvement in Alcohol-Burners, of which the following is a specification.

This invention relates to those alcohol-burners in which provision is made for regulating the heat and for extinguishing the flame at will, and primarily to those burners which are designed and adapted to be used wholly without any wick or absorbent, so that when the flame is put out the unconsumed spirit may be decanted and kept for future use.

The leading object of the present invention is the construction of an alcohol-burner for chafing-dishes and the like adapted to have all the characteristics above stated.

Other objects are to supply the vapor with an abundance of oxygen in such a way as to render the burner effective as soon as it is lighted, to provide the burner with an air-supply regulator having a handle by which the burner as a whole may be handled, and to facilitate holding the burner-bowl against turning with said regulator.

The invention consists in certain novel combinations of parts hereinafter described and claimed.

A sheet of the drawings accompanies this specification as part thereof.

Figure 1:
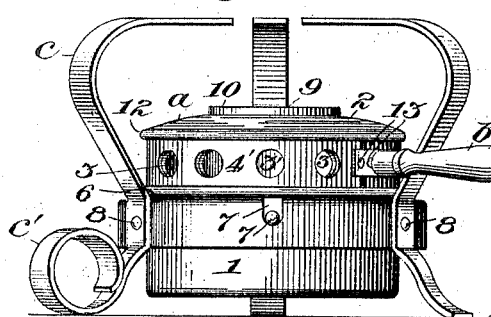
Figure 3:
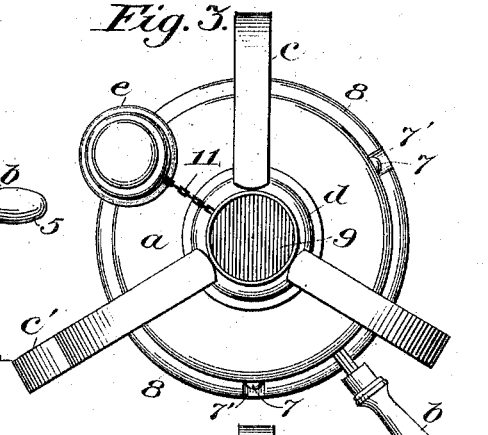
Figure 2:
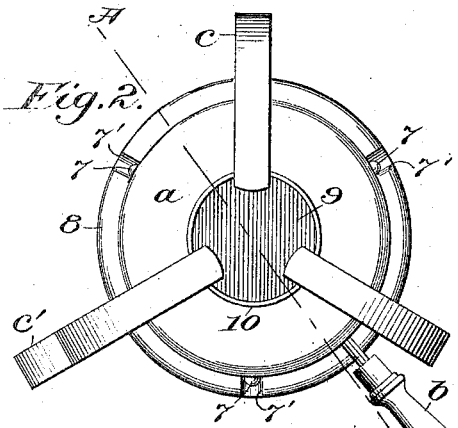
Figure 4:
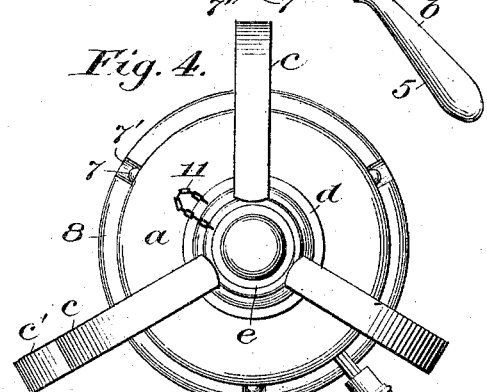
Figure 5:
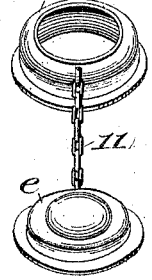
Figure 6:
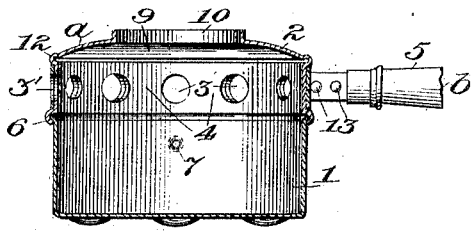

Figure 1 is a side view of a small tripod-stove embodying the improved burner as it appears without its flame-contracting ring and extinguisher. Fig. 2 is a top view projected from Fig. 1. Fig. 3 is a top view showing the flame-contracting ring and extinguisher with the former in its operative position. Fig. 4 is a top view showing the extinguisher in place. Fig. 5 is a perspective view of the flame-contracting ring and extinguisher detached; and Fig. 6 represents a section on the line A B, Fig. 2, through the burner proper removed from the tripod.

Like reference characters refer to like parts in all the figures.

The burner-bowl $a$ in all its forms is preferably and conveniently round in shape, as represented in Figs. 2, 3, and 4, and includes lower and upper portions 1 and 2 of suitable sheet metal, of which the former is an imperforate pan-like portion adapted to hold the supply of alcohol, and the upper portion 2 is provided near the top of the burner with a circumferential series of air-admitting holes 3, separated from each other by interspaces 4 of greater width than the individual holes. Said upper portion 2 of the burner-bowl is embraced by a circumferential air-supply regulator $b$, having air-admitting holes $3'$ and interspaces $4'$, corresponding with those of the bowl, and provided with a horizontally-projecting handle 5 as means for turning said regulator circumferentially to reduce or cut off the admission of air. The burner-bowl $a$ is further constructed with a circumferential bead 6 at about mid-height, and immediately below this bead is preferably and conveniently provided with embossed projections 7, (one or more,) and is thus adapted to be held while in use within a simple tripod or like portable frame $c$, having a horizontal ring 8, adapted to embrace the cup below said bead 6, and provided with notches $7'$, corresponding with and adapted to admit said projections 7 on the burner-bowl, as in Fig. 1, so that the burner-bowl can be held against turning by means of the frame $c$ when the air-supply regulator $b$ is turned. To facilitate so holding the burner-bowl by means of the frame $c$, the latter may be constructed with a handle $c'$, integral with one of the legs of the tripod; but this is not considered essential.

The top of the improved burner is provided with a suitable flame-orifice 9, which is preferably and conveniently central and round, as shown, and surrounded by an upturned lip 10, and this lip 10 is embraced by a flame-contracting ring $d$ when it is desired to use a flame of less diameter or preliminary to extinguishing the flame, and a flame-extinguishing cap $e$ is fitted to the top of said flame-contracting ring $d$ and is loosely connected therewith—as, for example, by a short length of chain 11.

As shown in Fig. 6, the upper and lower portions 1 and 2 of the burner-bowl $a$ are two distinct pieces, and a circumferential joint forms said circumferential bead 6. The upper portion 2 is further constructed with a circumferential bead 12, parallel to said bead 6. The body of the air-supply regulator $b$ in the form of a perforated band embraces the burner-bowl $a$ between said beads 6 and 12, and the ends of this band are connected with each other and with the metallic stem of a wooden or equivalent cold handle 5 by rivets 13.

After supplying the lower portion of the burner-bowl $a$ with alcohol through the flame-orifice 9 and with the latter wide open the air-admitting holes 3 are fully opened by turning the air-supply regulator $b$, if need be, and the spirit is then ignited. The relatively cold air entering the air-admitting holes 3 tends to descend relatively to the hot vapor and mingles with the vapor in a highly effective manner within the upper portion of the burner-bowl, so as to keep the flame well supplied with oxygen. The flame issues from the flame-orifice 9, which ordinarily may remain wide open. To reduce the flame as to diameter, the flame-contracting ring $d$ is placed in position around the flame-orifice lip 10, as in Fig. 3, and the burner may be used in this condition with or without turning the air-supply regulator to reduce the supply of air. When the flame is to be extinguished, the air-supply regulator $b$ is turned so as to fully cut off the supply of air through the air-admitting holes 3, and with the flame-contracting ring $d$ in position the extinguishing-cap $e$ is applied to said ring $d$, as in Fig. 4, which cuts off the supply of air from above and immediately extinguishes the flame. After permitting the burner to cool the air-supply regulator may be moved so as to open the air-admitting holes 3, and any alcohol remaining in the burner-bowl may be poured out through these holes so as to be saved. In this and other manipulations of the burner as a whole the handle 5 of the air-supply regulator $b$ may be used as the handle of the whole burner. A cap similar to said extinguishing-cap $e$, but of sufficiently greater diameter, may obviously be applied directly to the flame-orifice lip 10 without the intervention of the flame-contracting ring $d$. Said ring $d$ and cap $e$, or either of them, may be provided with handles by which to manipulate them. Said flame-contracting ring $d$ may be hinged or otherwise attached to the top of the burner-bowl, and other like modifications will suggest themselves to those skilled in the art.

Having thus described said improvement, I claim as my invention and desire to patent under this specification—

In an alcohol-burner, the combination with a supporting-tripod of a burner-bowl consisting of two pieces united by a circumferential bead by which the burner is supported in its tripod, the uppermost piece having a flame-orifice, a circumferential bead about its upper edge and a circumferential series of air-admitting holes separated from each other by interspaces of greater width than the individual holes and located between the two circumferential beads, means for preventing the burner from rotating in the tripod, a band located between and confined in place by said beads and provided with air-holes and interspaces corresponding with said air-holes and interspaces in the upper portion of the bowl, and a handle to which the ends of said band are secured, substantially as hereinbefore specified.

JOHN H. ERNST.

Witnesses:
GUY W. SERDON,
WH. HEISSENBUTTEL.